(12) United States Patent
Azizi et al.

(10) Patent No.: US 7,716,212 B2
(45) Date of Patent: May 11, 2010

(54) QUERY FRAMEWORK SYSTEM AND METHOD

(75) Inventors: Soufaine Azizi, Ottawa (CA); Vladimir Mordvinov, Nepean (CA); Michael C. Potter, Greely (CA)

(73) Assignee: International Business Machines Corporation, Armonk, NY (US)

( * ) Notice: Subject to any disclaimer, the term of this patent is extended or adjusted under 35 U.S.C. 154(b) by 259 days.

(21) Appl. No.: 11/473,375

(22) Filed: Jun. 22, 2006

(65) Prior Publication Data

US 2007/0073853 A1    Mar. 29, 2007

(30) Foreign Application Priority Data

Sep. 13, 2005    (CA) .................................. 2519010

(51) Int. Cl.
*G06F 17/30* (2006.01)

(52) U.S. Cl. ............... 707/718; 707/600; 707/999.001; 707/999.002; 707/999.003; 707/999.004; 707/999.005

(58) Field of Classification Search ................ None
See application file for complete search history.

(56) References Cited

U.S. PATENT DOCUMENTS

| | | | |
|---|---|---|---|
| 6,446,060 B1 * | 9/2002 | Bergman et al. ................ 707/3 |
| 6,609,123 B1 * | 8/2003 | Cazemier et al. ................ 707/4 |
| 6,754,652 B2 * | 6/2004 | Bestgen et al. .................. 707/3 |
| 6,931,392 B1 * | 8/2005 | Skeen ............................. 707/3 |
| 7,233,939 B1 * | 6/2007 | Ziauddin ........................ 707/2 |
| 7,296,099 B2 * | 11/2007 | Davison ...................... 710/15 |
| 7,321,888 B2 * | 1/2008 | Day et al. ....................... 707/2 |
| 2002/0133392 A1 * | 9/2002 | Angel et al. .................. 705/10 |
| 2002/0184206 A1 * | 12/2002 | Evans ............................. 707/4 |
| 2005/0076016 A1 * | 4/2005 | Mihai et al. .................... 707/3 |

FOREIGN PATENT DOCUMENTS

EP    1 133 486    9/2001

\* cited by examiner

*Primary Examiner*—Khanh B Pham
*Assistant Examiner*—Andalib F Lodhi
(74) *Attorney, Agent, or Firm*—Shumaker & Sieffert, P.A.

(57) ABSTRACT

A query framework system is provided. The query framework system comprises a query framework service for consuming a query and returning a result set, a provider application programming interface for defining a consistent application programming interface for providers, one or more providers incorporating query processing logic, and a configuration repository for storing the list of the providers in the query framework system and their properties.

19 Claims, 4 Drawing Sheets

QUERY FRAMEWORK SYSTEM AND METHOD

This application hereby incorporates by reference Canadian Patent Application 2,510,630, filed on Jun. 23, 2005.

FIELD OF THE INVENTION

The invention relates generally to data access middleware, and in particular to a query framework system and method.

BACKGROUND OF THE INVENTION

Prior business intelligence (BI) query engines are not extensible, are not data agnostic, and can not support the various requirements of a corporate performance management or a BI solution in a consistent manner. They can only support some of the BI requirements using fragmented and inconsistent sub-engines, each providing a subset of the solution. This inconsistency filters up to the front end of the solution and present the BI user with an inconsistent user experience.

SUMMARY OF THE INVENTION

In accordance with an embodiment of the present invention, there is provided a query framework system. The query framework system comprises a query framework service for consuming a query and returning a result set, a provider application programming interface for defining a consistent application programming interface for providers, one or more providers incorporating query processing logic, and a configuration repository for storing the list of the providers in the query framework system and their properties.

In accordance with another aspect of the present invention, a system with query processing operations distributed across multiple reusable components, query framework providers, is provided. A set of providers is defined that comprises a system performing processing of data agnostic BI queries.

DETAILED DESCRIPTION OF THE PREFERRED EMBODIMENTS

The present inventions allows for the building of business intelligence (BI) and corporate performance management (CPM) systems that query data using a BI query language that is data agnostic. The invention can also be applied to query processing systems supporting any other structured query language, for example SQL or MDX.

Figure 1:
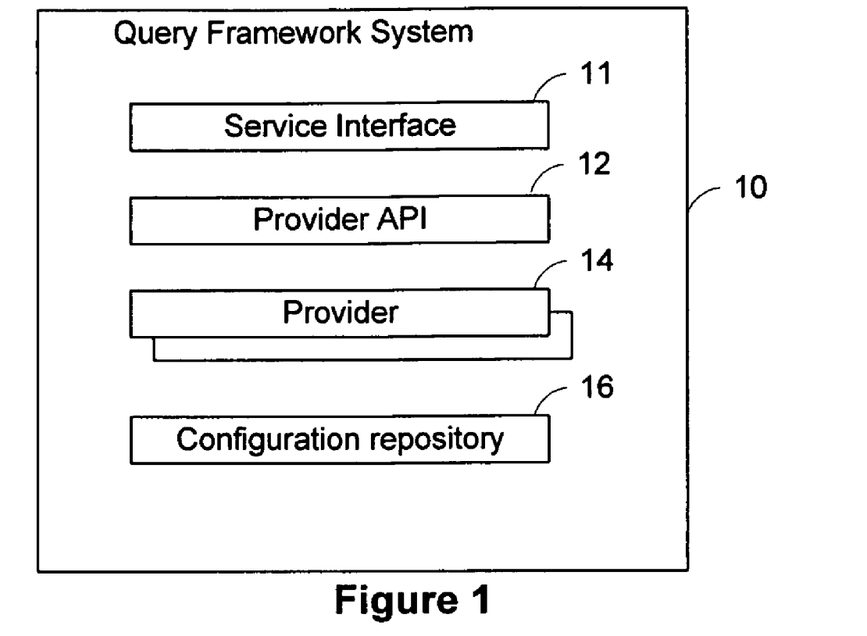
FIG. 1 shows in a block diagram an example of a query framework system 10, in accordance with an embodiment of the present invention.

FIG. 1 shows in a block diagram an example of a query framework system 10, in accordance with an embodiment of the present invention. The query framework system 10 comprises a query framework service 11 for consuming a query and returning a result set, a provider application programming interface (API) 12 for defining a consistent provider API, one or more providers 14 and a configuration repository 16.

Figure 2:
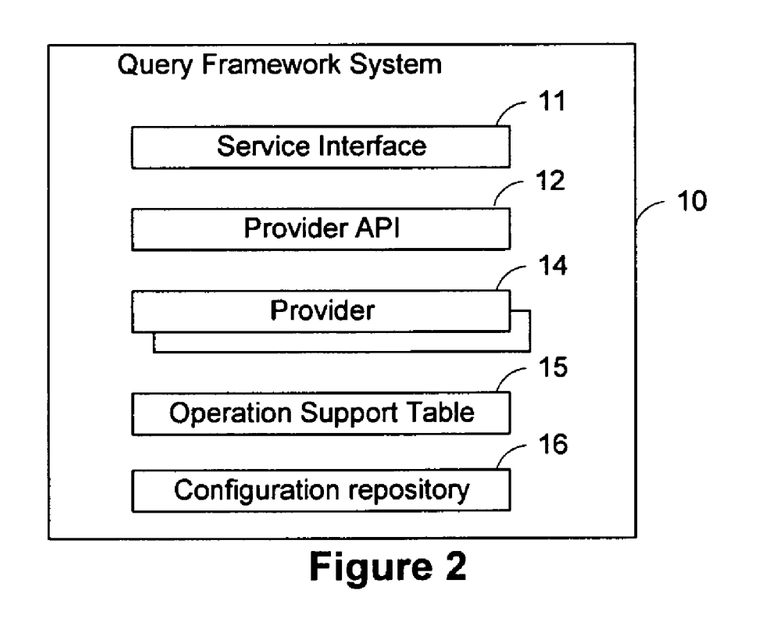
FIG. 2 shows in a block diagram another example of a query framework system 10, in accordance with an embodiment of the present invention.

FIG. 2 shows in a block diagram another example of a query framework system 10, in accordance with an embodiment of the present invention. The query framework system 10 comprises a query framework service 11 for consuming a query and returning a result set, a provider application programming interface (API) 12 for defining a consistent provider API, one or more providers 14, an operation support table 15 for allowing for an initial distribution of operations involved in a query between providers, and a configuration repository 16.

The ability to support an end to end CPM solution (Planning, Business Intelligence, and Score Carding) using the same query engine and hence the same underlying software platform is an advantage of the query framework system 10. Other advantages include the flexibility of the overall system architecture which is easily maintainable and extendable. Customers, other solution providers, and OEMs can build on top of this framework their own business logic and hence customize an out of the box CPM. Also, the benefit to the end user in terms of consistency in his/her experience, whether reporting, ad-hoc querying, or analyzing data from various types of data source technology is another advantage.

Query processing usually is done in two phases: query planning and query execution. During query planning a query received from a user is gradually transformed into an execution plan, the tree of nodes representing operations to be performed during execution phase. Distributed query planning in the query framework system is achieved by breaking the full query into portions supported by corresponding providers. During the planning phase providers receive a designated query portion to apply planning actions. Providers analyze the designated query part and contribute to planning of this portion if they detect that their planning functionality is applicable to a given query portion. Providers may prepare the query portion, i.e., plan the actions to be performed during the execution phase and replace this query portion with its execution plan. Providers may transform this query portion into another form in order to facilitate its preparation by other providers. The sequence of the provider invocation during query planning is predefined and stored in the configuration repository. The sequence of the provider invocation during the execution phase is driven by the execution plan built as a result of the planning phase. Provider execution method manipulates the data received from underlying datasources or other providers in order to produce the result master dataset returned back to a system user.

Existing data processing frameworks like ODBC or OLEDB effectively provide an ability to distribute execution of a query across different components. Yet the sequence of these operations had to be defined by a client application that would have to specify exactly what components are to be used to execute given query.

The query framework system 10 allows to distribute not only the query execution phase functionality across multiple components, but also to distribute the planning logic. It does not require a client application to be responsible for formulation of an operation execution sequence. Instead the configuration of the query framework would determine the execution operation sequence, the execution plan, during distributed query planning phase.

The main principle the distributed planning is based on is the ability of providers to recognize and extract the operations they can support out of a query portion they receive during the planning phase. Decomposition providers can break a full query into a tree of smaller sub-queries to make it possible for providers to take a responsibility for those sub-queries they can actually support.

Another cornerstone of the query framework is the unified Provider API interface 12 that includes not only the methods involved in data retrieval, but also the methods invoked during query planning. All providers are required to implement this interface and hence all providers are capable of participation in the query planning process.

Provider API 12 as well as the client facing query framework API 11 also serve the data agnostic function, i.e. these interfaces provide an access and ability to manipulate both relational and multidimensional or OLAP data.

Provider Categories

The query framework can be filled with any set of providers. It is recognized, though, that the following categories of providers will provide the completeness and flexibility of the query processing system 10 as well as reusable nature of the system components, query framework providers. The categories are: query transformation providers, service provider and query planning providers.

Query planner providers provide access to data either through internal operations or by calling external components providing data. The operation of query planner providers typically involves translation of the BIQuery language into the query language of underlying data sources, such as relational databases supporting SQL query language. Query planner providers plan and execute a query portion or whole query that the coordinator designates to them. A result of execution is one or more master datasets.

Service providers handle operations that are not supported by planner providers. During query planning the service provider take the responsibility for the portion of a query not supported by planner providers. During execution service providers perform post-processing of data returned by query planner providers. This category of providers can be replaced, newly added or extracted out the system with minimum disruption to the query framework system.

Figure 3:
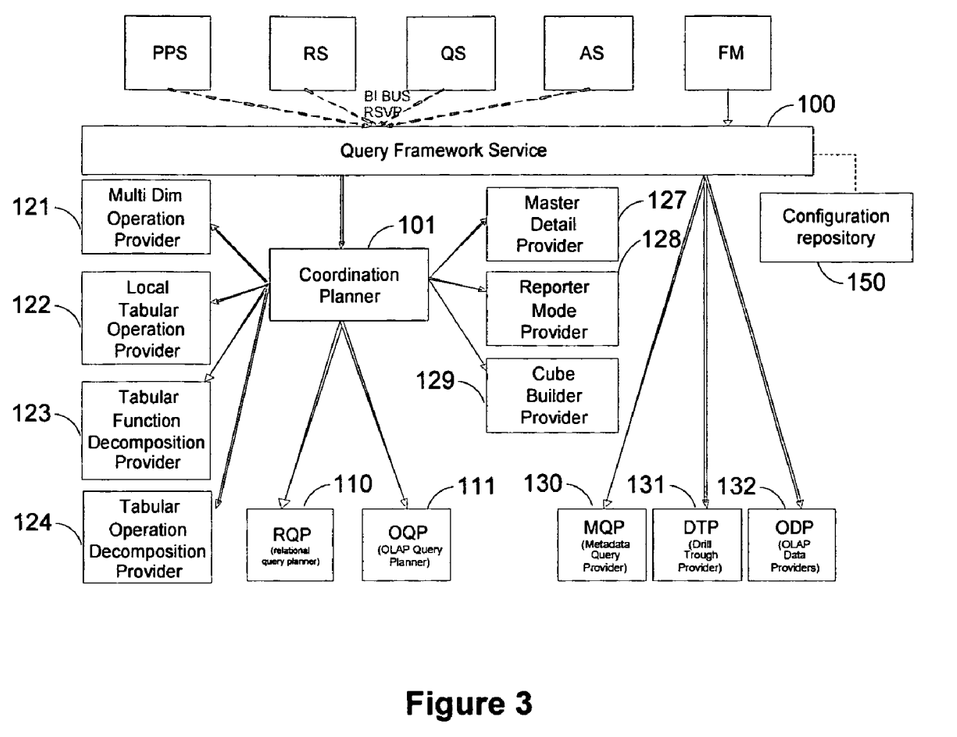
FIG. 3 shows in a block diagram a more detailed example of a query framework system.

Query transformation providers are involved in the query planning process. They are to perform query manipulations required to facilitate query planning process. Important instances of query transformation providers are query refinement providers, query decomposition providers and query optimization providers. The refinement provider enhances a query specification to disambiguate, clarify and make it easier to work with by other providers in the query framework system. The decomposition providers break a complex query into an equivalent combination of simpler queries. Decomposition allows the coordinator 104 to distribute only portions of a full query to appropriate providers that do not support all operations involved in the full query. Query optimization providers are to transform a query in order to speed up a query execution.

The provider of the decomposition into primitive operations can be present in the query framework system to play a special role of insuring the system completeness given the system also has service providers associated with every primitive operation. The primitive operation denotes a simplest operation that constitutes an indivisible query part. The examples of primitive macro operations that can be recognized in the SQL query language are: filter operation, grouping and aggregation operation, sorting operation, joining operation, etc.

Configuration Repository 16

Query framework configuration repository contains the parameters of the system as a whole, the list of providers and their properties. A provider becomes integrated into the query framework system once it is described in the configuration repository, so the query framework is easily extendable.

A provider is described by its identifier, the name of a shared library/DLL containing the provider functionality. It is defined whether a provider is optional or mandatory for the system work, the property that separates essential system functionality from an additional plug-ins.

Properties of a provider connection and metadata cache can be configured by the system defaults or can be overridden by the configuration parameters defined for specifically for a given provider.

Provider configuration has the section "provider details" that contains parameters applicable only to a given provider and interpreted by the provider itself.

The configuration repository also contains operation support tables of those providers that do not support the Discover method. It simplifies the access and maintenance of the operation support tables of those providers that do not require being self-described in the system through the Discover method.

Coordination Planner 101

The query framework system coordination planner 101 (or coordinator) is the component that is responsible for delegating the planning and execution of a BIQuery or its portions to a list of available providers. The coordinator makes use of available query transformation providers, planner providers, and service providers to refine, plan, decompose and execute a query.

The coordinator 101 is designed to have no specific knowledge about the available providers. Their capabilities, in terms of the supported operations, and the sequence of their invocation, are discovered at run time based on the information stored in the configuration repository and with the information returned by the provider method describing the provider properties. This design is intended to support feature providers to seamlessly plug-in to the coordination layer in order to extend the query framework system 10 functionality (examples are "disclosure avoidance" provider or Custom Add-on Filters).

During the query planning phase of query processing, the coordinator 101 invokes providers according to the query processing sequence stored in the configuration repository 150. The coordinator 101 extracts the query portion supported by a given provider according to the operation support table of this provider. If the extracted query portion is empty the provider is not invoked. The coordinator 101 then sends the extracted portion to the provider planning method and incorporates the result of the planning back into the query. One or more passes over the query processing sequence are expected to result into a completely planned query comprising a query execution plan, the tree of executable operations.

The execution plan is used by the coordinator 101 in order to guide the provider invocation during the execution phase of query processing. The coordinator 101 first invokes providers responsible for the leaf nodes of the execution plan tree. The coordinator 101 sends the executable operation definition to the execution method of corresponding provider and collects result datasets the provider returns. The collected result master datasets are passed by the coordinator to the providers higher in the execution plan tree as non-leaf nodes in the execution plan denote operations applied on top of one or more input master data streams.

Using this mechanism the coordinator 101 distributes parts of the decomposed query among one or more planner providers for execution. The planner providers execute the query with the help of data providers and return master datasets pointers to the coordinator 101. The coordinator 101 then distributes the other parts of the decomposed query among service providers, passing them pointers to the master datasets as input stream. The service providers apply local query operations on these input streams and return result master datasets to the query framework service 100, which in turn, returns them to the consumer application that submitted the original BIQuery for execution. This final result set returned to the client could span multiple planners and data source types.

Preferably, the coordinator 101 shares the same interface, the provider API 12, with all providers in the query framework 10. The coordinator 101 acts as any other component in the system. Hence as any other component it can be replaced if needed. Adherence to the same interface also allows for recursive calls from other providers needed in some cases in order to force execution of the BlQuery portions that have to be processed out of the ordinary sequence.

The coordination layer of the query framework system architecture is the layer composed of the coordinator 101 and the available query transformation providers (which encapsulate query refinement, decomposition, and optimization functionality) and the available service providers (which encapsulate local execution, tabular operations, and multi-cube joining functionality). The coordination layer of the query framework 10 breaks any client dependency on the data source technologies available underneath the query framework service 100. In other words, the coordination layer provides data agnostic query capabilities that can span relational, multidimensional, and proprietary vendor data sources to clients of the query framework system 10 that use high level and simple BIQuery semantics. Data agnostic query capability is the main role of the query framework coordination layer. Another important role is the centralization of common query operations across all types of planner providers. Common functionality that would have been implemented repeatedly by each planner provider should be factored out to this layer.

System Supporting Data Agnostic BIQueries.

The following is an example of a set of providers that comprises a query framework system capable of handling data agnostic BI queries.

This system can include a relational query planner 110, an OLAP query planner 111, a multidimensional operation decomposition provider 121, a local tabular operation provider 122, a tabular function decomposition provider 123, a tabular operation decomposition provider 124, a master detail provider 127, a report mode provider 128, and a cube builder provider 129.

The relational query planner 110 is to handle query operation that can be converted into SQL statements. The relational query provider 110 sends its queries to relational data sources.

The OLAP query provider 111 handles query operations that can be converted into MDX statements. The OLAP query provider 111 sends its queries to OLAP data sources.

The multidimensional operation decomposition provider 121 performs a decomposition of queries containing OLAP operations on top of relational datasources. It may decompose a query into 4 sub-queries: a sub-query that contains only relational operations, a sub-query responsible for the pivoting operation, a sub-query containing a OLAP functions, and a sub-query providing a final post-processing of the result of first three sub-queries.

The cube builder provider 129 performs a pivoting operation of transforming a tabular stream into a cube dynamically created to represent pivoted dataset.

The local tabular operation provider 122 can apply SQL operations to an input data stream. This provider can be implemented as an extension of the functionality of the relational query provider 111 that treats an input data stream as a special relational datasource.

The tabular operation decomposition 124 provider is responsible for handling operations over tabular streams, like union, except or intersect on top of OLAP datasources that do not support these operations natively.

The tabular function decomposition provider 123 is responsible for decomposing the queries containing SQL-like functions on top of OLAP datasources that do not support these operations natively.

The master detail provider 127 is to handle master-detail links between two independents queries. The master detail provider as well as the tabular operation decomposition provider allow combining data from relational and OLAP datasources.

The report mode provider 128 extends the OLAP finctionalities by lifting limitation of MDX query language: unioning of members from different dimensions, projecting the same dimension on two or more edges, and unioning member tuples of different size.

The functionality of the described providers can be rearranged in a different set of components by combining the feature of several providers into a single one or conversely by distributing a functionality of a single provider to a set of several components.

Other components may be added to the system 100, including a no data mode provider, a translator, a post-processor, a metadata query provider 130, a drill through provider 131, and an OLAP data provider 132. FIG. 3 shows in a block diagram a more detailed example of a query framework system 10.

Provider API 12 and Operation Support Table 15

The provider API 12 and the operation support table (OST) 15 are central to the query framework 10 architecture. In particular, the Prepare( ) method of the provider API 12 and the OST 15 are be the basis for the query planning process.

The operation support table 15 is associated with every relevant provider. It defines which operations from a pre-defined set are supported by a given provider. Operations are recognizable patterns in a tree of query blocks or in a tree of a query block specification. Operations are associated with a given node of a corresponding tree and searched for in the context of this node. The coordinator defines these patterns and provides the logic of spotting them in a query block tree and reporting "supported/unsupported" association of an operation with each provider.

The operation support table 15 allows for an initial distribution of the operations involved in the query between providers participating in the query framework. In most use cases that are handled by a query engine, this initial distribution based on the data source type will be sufficient. That is, all current queries involving only dbQuery subjects and current relational expressions are assigned to the relational planner based on the corresponding data source type in the OST 15. Also, all current queries involving mdQuery subjects and dimensional expressions will be assigned to the OLAP planner based on the corresponding data source type in the OST 15.

Resource Pool

The coordinator 101 owns two resources pools: a request resource pool and a connection resource pools. These pools contains resources that can be reused between different stages of query processing and shared across different provider participating in an execution of the a given request or associated with a given connection. Request resource pool contains resources pertaining to the same client query set to the query framework system. Connection resource pool contains resources that depends only on the properties of the connection and hence can be reused for multiple requests performed though the connection. The resource pools are accessible for all providers to add and read instances of the resources. The request resource pool is destroyed by the coordinator 101 once the input request is completely processed. The connection resource pool get destroyed when the connection is closed. Resources are classified into types. A resource type denotes the semantics of a resource items and also is associated with the interface class used to access the content of a resource item. Some resource item types can be predefined in a query processing system for resources needed by every provider. Other types are specific for a given provider and are dynamically generated.

Example Provider API

Figure 4:
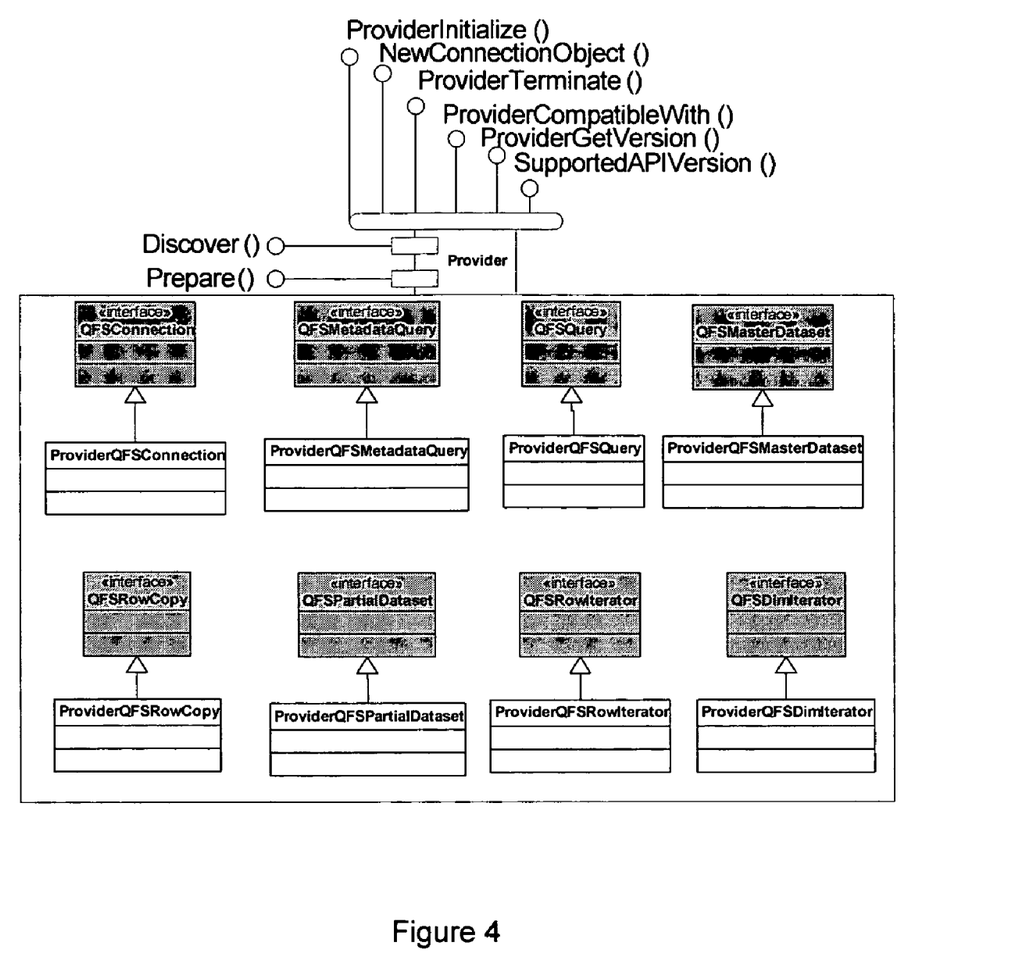
FIG. 4 shows a high level view of an example of a design of a planner, data, or service provider within the query framework system.

FIG. 4 shows a high level view of an example of a design of a planner, data, or service provider within the query framework system 10. Interface classes are implemented in the query framework layer; the boxes are classes implemented by the provider and inherit the QF base implementation)

Each provider implements the following methods:
ProviderInitialize( )
NewConnectionObject( )
ProviderTerminate( )
ProviderCompatibleWith( )
ProviderGetVersion( )
SupportedAPIVersion( )

They are used to initialize the provider, create a new connection object, and shut provider down, respectively.

Additionally, each provider implements the following classes:
ProviderQFSConnection
ProviderQFSMetadataQuery
ProviderQFSQuery
ProviderQFSMasterDataset
ProviderQFSPartialDataset
ProviderQFSEdgeIterator
ProviderQFSCellIterator
ProviderQFSRowCopy In each name, prefix Provider is replaced with abbreviation that uniquely identifies the provider type. Each such class inherits from the standard Query Framework Service (QFS) class with a similar name less the prefix Provider. For example, VendorQFSConnection inherits from QFSConnection.

Each method that a provider has to implement is defined as "abstract" in its parent class and has a provider prefix in its name. For example, QFSMetadataQuery requires that the related provider class implements ProviderExcute( ) method. Provider is not allowed to overload other methods from the parent class.

Methods with the provider prefix are called by equivalent non-abstract methods of the parent, giving the provider a chance to perform processing that is provider-specific. For example, ProviderQFSConnection:: ProviderDiscover( ) is called by method QFSConnection::Discover( ).

The following is a list of methods that are implemented in every provider:

| Class | Method | Purpose |
| --- | --- | --- |
| <global members> | NewConnectionObject( ) | Instantiates new connection object |
|  | ProviderInitialize( ) | Initializes provider (run once upon loading of the shared library) |
|  | ProviderTerminate( ) | Un-initializes provider (run once upon unloading of the shared library) |
|  | ProviderCompatibleWith( ) | Checks if provider is compatible with specified provider version |
|  | ProviderGetVersion( ) | Retrieves provider version |
|  | SupportedAPIVersion( ) | Retrieves supported QFS version |
| ProviderQFSConnection | ProviderConnect( ) | Requests a new connection to the data provider |
|  | ProviderClose( ) | Closes current connection |
|  | ProviderDiscover( ) | Reports provider properties |
|  | ProviderTest( ) | Tests data source Connection |
|  | ProviderNewMetadataQuery( ) | Instantiates new metadata query object |
|  | ProviderNewQuery( ) | Instantiates new data query object |
| ProviderQFSMetadataQuery | ProviderExecute( ) | Executes metadata query |
|  | ProviderCancel( ) | Cancels metadata query |
|  | ProviderClose( ) | Closes metadata query object |

-continued

| Class | Method | Purpose |
|---|---|---|
| ProviderQFSQuery | ProviderPrepare( ) | Plan query |
| | PrividerExecute( ) | Execute data query |
| | ProviderCancel( ) | Cancels data query |
| | ProviderClose( ) | Closes data query object |
| ProviderQFSMasterDataset | ProviderGetDatasetInfo( ) | Retrieves general master dataset info |
| | ProviderGetPartialDataset( ) | Requests partial dataset |
| ProviderQFSPartialDataset | ProviderGetEdgeIterator( ) | Retrieves edge iterator |
| | ProviderGetCellIterator( ) | Retrieves cell iterator |
| ProviderQFSCellIterator | ProviderGetNumRows( ) | Retrieves number of rows in iterator |
| | ProviderGetRowsetId( ) | Retrieves offset of rowset descriptor |
| | ProviderGetPosition( ) | Returns current iterator position |
| | ProviderNext( ) | Positions iterator at the next row |
| | ProviderPrevious( ) | Positions iterator at the previous row |
| | ProviderGoto( ) | Positions iterator at the specified row |
| | ProviderGetMemberOrdinal( ) | Retrieves ordinal position of a member along an edge of a crosstab report |
| | ProviderGetEdgeOrdinal( ) | Retrieves row's ordinal position from a cell rowset along the specified edge |
| | ProviderGetSummaryLevel( ) | Retrieves summary level of the current row |
| | ProviderGetColumn( ) | Retrieves column value and state |
| | ProviderGetColumnAsVariant( ) | Retrieves column value and state |
| | ProviderGetRow( ) | Retrieves entire current row |
| | ProviderGetRowCopy( ) | Saves a the row of data for future use |
| ProviderQFSSetIterator | ProviderGetNumRows( ) | Retrieves number of rows in iterator |
| | ProviderGetRowsetId( ) | Retrieves offset of rowset descriptor |
| | ProviderGetPosition( ) | Returns current iterator position |
| | ProviderNext( ) | Positions iterator at the next row |
| | ProviderPrevious( ) | Positions iterator at the previous row |
| | ProviderGoto( ) | Positions iterator at the specified row |
| | ProviderGetMemberOrdinal( ) | Retrieves ordinal position of a member along an edge of a crosstab report |
| | ProviderGetEdgeOrdinal( ) | Retrieves row's ordinal position from a cell rowset along the specified edge |
| | ProviderGetSummaryLevel( ) | Retrieves summary level of the current row |
| | ProviderGetColumn( ) | Retrieves column value and state |
| | ProviderGetColumnAsVariant( ) | Retrieves column value and state |
| | ProviderGetRow( ) | Retrieves entire current row |
| | ProviderGetRowCopy( ) | Saves a the row of data for future use |
| | ProviderGetNumChildren( ) | Returns number of children for the current member |
| | ProviderToChildren( ) | Positions iterator on the first child of the current member |
| | ProviderToParent( ) | Positions iterator on the parent of the current member |

-continued

| Class | Method | Purpose |
|---|---|---|
| ProviderQFSRowCopy | ProviderGetRowsetId( ) | Retrieves offset of rowset descriptor |
| | ProviderGetPosition( ) | Returns current iterator position |
| | ProviderGetMemberOrdinal( ) | Retrieves ordinal position of a member along an edge of a crosstab report |
| | ProviderGetEdgeOrdinal( ) | Retrieves row's ordinal position from a cell rowset along the specified edge |
| | ProviderGetSummaryLevel( ) | Retrieves summary level of the current row |
| | ProviderGetColumn( ) | Retrieves column value and state |
| | ProviderGetColumnAsVariant( ) | Retrieves column value and state |
| | ProviderGetRow( ) | Retrieves entire current row |

Provider authors can use the provided GenericProvider as the basis of their implementation and for more detailed information on methods and classes that are implemented.

Preferably, Provider is packaged in a form of shared library/DLL that is loaded by QFS on demand. Provider remains loaded in memory as long as there is at least one connection open to it. After all connections to the provider are closed, provider library is unloaded by QFS.

Figure 5:
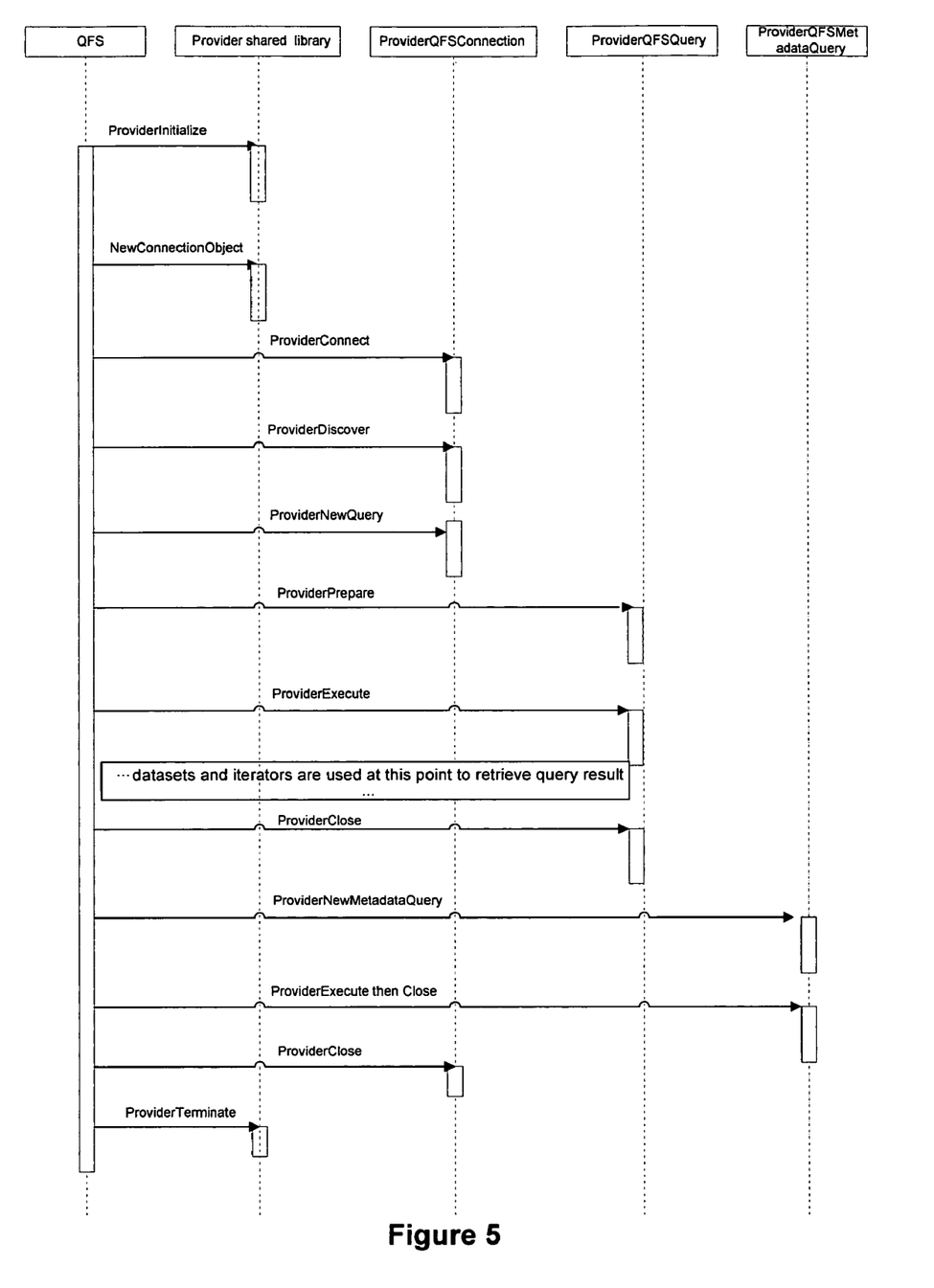
FIG. 5 illustrates a sample scenario of a provider use, in accordance with an embodiment of the query framework system.

FIG. 5 illustrates a sample scenario of a Provider use, in accordance with an embodiment of the query framework system 10. When provider is loaded, its ::ProviderInitialize( ) method is called. This gives provider a chance to execute certain operations once. This method is called only once.

Every time QFS needs to open a new connection it calls provider method ::NewConnectionObject( ), which returns a new instance of a connection object, ProviderQFSConnection. At this point connection to data source has not yet been established. It is opened when ProviderQFSConnection::ProviderConnect( ) method is called. Concurrent calls can be made to this method from multiple threads and so it must be implemented to be thread-safe.

After connection is initialized it is used to query provider for properties (ProviderQFSConnection::ProviderDiscover( )), and create new metadata and data query objects (ProviderQFSConnection::ProviderNewMetadataQuery( ) and ProviderQFSConnection::ProviderNewQuery( )).

ProviderQFSMetadataQuery object is used to execute metadata queries on the data source. ProviderQFSMetadataQuery::ProviderExecute( ) is called to perform actual execution.

ProviderQFSQuery object is used to execute data queries on the data source. ProviderQFSQuery::ProviderPrepare( ) is called during planning stage of query processing in order to invoke provider query planning logic. ProviderQFSQuery::ProviderExecute( ) is called to perform actual execution, and its result is an instance of ProviderQFSMasterDataset that is then used to retrieve results of query execution in binary form.

ProviderQFSMasterDataset is used to request information about different portions of the result set in the form of ProviderQFSPartialDataset objects. Each of those data sets is then queried using instances of ProviderQFSIterator.

ProviderClose( ) method is called to destroy connections and queries of both types.

When provider is no longer needed it is unloaded from memory. At this moment its::ProviderTerminate( ) method is executed, giving it a chance to free system resources. This method is called only once.

ProviderCancel( ) method is used to cancel query that is currently being executed. This method is called at any point in time during query processing from a separate thread and therefore must be thread-safe.

The systems and methods according to the present invention may be implemented by any hardware, software or a combination of hardware and software having the functions described above. The software code, either in its entirety or a part thereof, may be stored in a computer readable memory. Further, a computer data signal representing the software code that may be embedded in a carrier wave may be transmitted via a communication network. Such a computer readable memory and a computer data signal are also within the scope of the present invention, as well as the hardware, software and the combination thereof.

While particular embodiments of the present invention have been shown and described, changes and modifications may be made to such embodiments without departing from the true scope of the invention.

What is claimed is:

1. A query framework system comprising:
a processor executing instructions;
a memory storing instructions coupled to the processor, when executed by the processor the instructions providing:
a query framework service consuming a query and returning a result set having a provider application programming interface defining a consistent application programming interface for providers;
one or more providers incorporating query processing logic of one or more query processing operations, the one or more providers implementing the provider application programming interface, each of the one or more query processing operations consuming a different portion of the query and returning a resultant query portion, wherein each of the one or more providers supports a unique subset of the one or more query processing operations, wherein the one or more providers includes one or more of:
query transformation providers for performing query transformation during a query planning phase of query execution; and
query planning providers for providing access to external data sources by translating the query portion to a query language of the underlying data source;

a configuration repository for storing a list of the one or more providers in the query framework system and their properties;

an operation support table describing the one or more query processing operations supported by each of the one or more providers; and a coordination planner organizing the processing of the query by the one or more providers based on the supported query processing operations stored in the operation support table, wherein the coordination planner decomposes the query into the different portions such that at least two of the different portions of the query are mutually exclusive.

2. The query framework system as claimed in claim 1, wherein the provider application programming interface includes query planning means For analyzing a designated one of the different portions and for preparing an execution of the designated query portion.

3. The query framework system as recited in claim 1, wherein the provider application programming interface is data agnostic.

4. The query framework system as recited in claim 1, wherein the query service comprises a resource pool module for managing resources used by the one or more providers.

5. The query framework system as recited in claim 4, wherein the resource pool module registers, stores, provides access to, and deletes the resources.

6. The query framework system as recited in claim 1, wherein the coordination planner distributes the different portions of the query to the one or more providers according to the one or more query processing operations supported by each of the one or more providers.

7. The query framework system as recited in claim 1, wherein the coordination planner is built as a provider and implements the provider application programming interface.

8. The query framework system as claimed in the claim 1, wherein the one or more providers are categorized into one or more groups for facilitating the provider design.

9. The query framework system as claimed in claim 1, wherein service providers are responsible for the portion of a query not supported by planner providers and perform designated operation as a post-processing of data returned by planner providers.

10. The query framework system as claimed in claim 1, wherein the one or more providers comprises one or more of:

a relational query planner for handling query operations that can be convened into SQL statements and sends its queries to relational data sources;

an OLAP query planner for handling query operations that can be converted into MDX statements and sends its queries to OLAP data sources;

a local tabular operation and function provider for applying SQL operations to an input data stream;

a multidimensional operation decomposition provider for performing a decomposition of queries containing OLAP operations on top of relational datasources;

a tabular operation decomposition provider for handling operations over tabular streams, like union, except or intersect on top or OLAP datasources that do not support these operations natively;

a tabular function decomposition provider for decomposing the queries containing SQL-like functions on top of OLAP datasources that do not support these operations natively;

a master detail provider for handling master-detail links between two independents queries;

a report mode provider extending the OLAP functionalities by lifting limitation of MDX query language: unioning of members from different dimensions, projecting the same dimension on two or more edges, and unioning member tuples of different size; and a cube builder provider for performing a pivoting operation of transforming a tabular stream into a cube dynamically created to represent pivoted dataset.

11. The query framework system of claim 1, wherein the coordination planner receives the query, identifies the query processing operations of the operation support table required to process the query, determines the two or more providers that support the query processing operations from the configuration repository, separates the query into the different portions based on the processing operations of the determined providers, and sends the different portions of the query to the respective providers.

12. The query framework system of claim 11, wherein the coordination planner assembles the resultant query portions from the providers as the result set.

13. The system of claim 1, wherein the query comprises a complex query, and wherein the different portions comprise simpler queries, in comparison to the complex query, such that the query is equivalent to a combination of the simpler queries.

14. The system of claim 1, wherein the one or more providers comprise at least one of a query transformation provider, a service provider, a query planning provider, a query refinement provider, a query decomposition provider, and a query optimization provider.

15. A method comprising:

receiving a query by a computing device of a query processing system;

determining, by the computing device, a set of query processing operations provided by a plurality of providers from an operation support table, wherein each of the providers supports a unique subset of the query processing operations, wherein the plurality of providers includes one or more of query transformation providers for performing query transformation during a query planning phase of query execution, and query planning providers for providing access to external data sources by translating the query portion to a query language of the underlying data source;

decomposing, by the computing device, the query into a plurality of different portions according to the query processing operations supported by the providers, wherein at least two of the different portions are mutually exclusive;

evaluating each of the different portions of the query with a corresponding one of the providers to produce a plurality of resultant query portions;

combining, by the computing device, the resultant query portions to produce a result set for the query; and returning, by the computing device, the result set.

16. The method of claim 15, wherein decomposing comprises distributing the different portions of the query to nodes of a tree, and wherein the nodes of the tree each comprise one of the different portions of the query.

17. The method of claim 16, wherein evaluating each of the different portions comprises assigning the nodes of the tree to particular ones of the providers and evaluating each of the nodes with the corresponding one of the providers.

18. The method of claim 16, wherein combining the resultant query portions comprises passing results of execution of a first group of nodes of the tree to a second group of nodes of the tree that are higher in the tree in comparison to the first group of nodes, such that the result of executing a root node of the tree comprises the result set.

19. A computer-readable medium comprising instructions for causing a programmable processor to:
receive a query in query processing system;
determine a set of query processing operations provided by a plurality of providers from an operation support table, wherein each of the providers supports a unique subset of the query processing operations, wherein the plurality of providers includes one or more of query transformation providers for performing query transformation during a query planning phase of query execution, and query planning providers for providing access to external data sources by translating the query portion to a query language of the underlying data source;
decompose the query into a plurality of different portions according to the query processing operations supported by the providers, wherein at least two of the portions are mutually exclusive;
evaluate each of the portions of the query with a corresponding one of the providers to produce a plurality resultant query portions;
combine the resultant query portions to produce a result set for the query; and
return the result set.

* * * * *